US012774192B2

(12) United States Patent
Palamides

(10) Patent No.: US 12,774,192 B2
(45) Date of Patent: Oct. 27, 2026

(54) METHOD FOR MOVING A STACK OF FLAT LAMINAR PRODUCTS, AND MOVING DEVICE FOR MOVING A STACK A FLAT LAMINAR PRODUCTS

(71) Applicant: Palamides GmbH, Renningen (DE)

(72) Inventor: Stefano Palamides, Grafenar (DE)

(73) Assignee: Palamides GmbH, Renningen (DE)

( * ) Notice: Subject to any disclaimer, the term of this patent is extended or adjusted under 35 U.S.C. 154(b) by 376 days.

(21) Appl. No.: 18/526,845

(22) Filed: Dec. 1, 2023

(65) Prior Publication Data

US 2024/0101398 A1 Mar. 28, 2024

Related U.S. Application Data

(63) Continuation of application No. PCT/EP2022/064712, filed on May 31, 2022.

(30) Foreign Application Priority Data

Jun. 1, 2021 (DE) ..................... 10 2021 114 166.4

(51) Int. Cl.
*B66C 1/16* (2006.01)

(52) U.S. Cl.
CPC ...................................... *B66C 1/16* (2013.01)

(58) Field of Classification Search
CPC .. B66C 1/16; B66C 1/18; B66C 1/585; B66C 1/12; B66C 1/122; B66C 3/04; B65H 2701/1932; B65H 31/3036; B25J 1/02; B62B 2203/44; B25B 13/52
USPC ........... 414/789.9, 734, 703, 739; 294/119.2, 294/67.4; 53/399, 586, 582, 589
See application file for complete search history.

(56) References Cited

U.S. PATENT DOCUMENTS

| | | | | |
|---|---|---|---|---|
| 4,293,155 A * | 10/1981 | Grant | B66C 1/12 294/75 |
| 8,307,614 B1 | 11/2012 | Louie | |
| 8,365,508 B2 * | 2/2013 | Kenney | B65B 13/04 53/399 |

(Continued)

FOREIGN PATENT DOCUMENTS

| | | | |
|---|---|---|---|
| DE | 147228 A1 | 3/1981 |
| DE | 102005028959 A1 | 2/2006 |
| WO | WO9507230 A1 | 3/1995 |

OTHER PUBLICATIONS

International Search Report dated Sep. 28, 2022 in corresponding application PCT/EP2022/064712.

*Primary Examiner* — Gregory W Adams
(74) *Attorney, Agent, or Firm* — Muncy, Geissler, Olds & Lowe, P.C.

(57) ABSTRACT

In order to move a stack of flat laminar products, a carrying device is used which has a support part, which is positioned above the stack, and a strap, which is secured to the support part. The strap is guided around the stack on the lower face and is secured to the support part, whereupon the support part is pressed against the stack by tensioning the strap and the stack, surrounded by the strap on the lower face, is then lifted. The stack is subsequently placed on a target storage area, and the strap is then released from the stack. The strap is gripped by a gripping device and is drawn from a strap storage spool, mounted on the support part, and the strap is placed around the stack. The strap is wound onto the strap storage spool in order to tension the strap.

14 Claims, 9 Drawing Sheets

(56) References Cited

U.S. PATENT DOCUMENTS

| | | | | |
|---|---|---|---|---|
| 8,443,723 | B2 * | 5/2013 | Liu | B65B 27/086 100/29 |
| 9,475,677 | B2 * | 10/2016 | Hansen | B66C 1/42 |
| 2002/0112456 | A1 * | 8/2002 | Bartelmuss | B65B 13/10 53/589 |
| 2023/0070015 | A1 * | 3/2023 | Rabaut | B66C 1/108 |

* cited by examiner

METHOD FOR MOVING A STACK OF FLAT LAMINAR PRODUCTS, AND MOVING DEVICE FOR MOVING A STACK A FLAT LAMINAR PRODUCTS

This nonprovisional application is a continuation of International Application No. PCT/EP2022/064712, which was filed on May 31, 2022, and which claims priority to German Patent Application No. 10 2021 114 166.4, which was filed in Germany on Jun. 1, 2021, and which are both herein incorporated by reference.

BACKGROUND OF THE INVENTION

Field of the Invention

The invention relates to a method for moving a stack of flat laminar products with a carrying device which has a support part, which is positioned above the stack, and a strap, which is secured to the support part, wherein strap is guided around the stack on the lower face and is secured to the support part and wherein the support part is then pressed against the stack by tensioning the strap and the stack, surrounded by the strap on the lower face, is then lifted, wherein the stack is subsequently placed on a target storage area, and the strap is then released from the stack.

In addition, the invention relates to a moving device for moving a stack of flat laminar products with a carrying device which has a support part and a strap which can be placed around the stack.

Description of the Background Art

The flat laminar products can be, for example, printed matter such as newspapers or advertising brochures or also carpet tiles, flat folding boxes, or printed circuit boards. In the following, a stack of newspapers is taken as an example, but the invention is not limited thereto and can also be used in a similar manner for stacks of other flat laminar products.

Newspapers are produced in high-speed printing presses and then counted and combined into stacks of a predetermined number of newspapers. These stacks can be further processed loosely, but it is also known to bundle the stacks with a band and/or to provide them with an outer packaging made of a plastic film, for example. For transport, the stacks are either placed on a transport pallet or inserted from above into an opened container or carton. To move a stack, it is lifted gripped below from opposite sides by means of a fork-shaped gripper and placed on the target storage area, i.e., on the transport pallet or in the carton. This has the disadvantage that the grippers require available space to the side of the stack, so that the stack cannot be put directly on an adjacent stack, or only with great effort. Setting down in a carton or container with a tight fit is also not possible with the known grippers.

If the stack needs to be inserted into a carton or container with a tight fit, this is usually done manually by support personnel. This procedure is laborious, time-consuming, and expensive.

It is known from other sectors of the economy, for example, from the construction industry, to move a stack of, for example, wooden panels with a crane by wrapping chains around the panel stack and lifting it by means of the crane. However, such an approach cannot be used for printed matter or newspapers, because the stack is relatively unstable and can therefore only be moved very slowly, which would reduce the performance of a printing press in an unacceptable way. With a rapid movement, there would be the risk that the stack would become unstable and the products would slip.

In regard to bar material, for example, steel bars, it is known from DD 147228 A1 to wrap a bundle of steel bars with a strap before lifting and then to tighten the steel bars by tensioning the strap against a counter bearing, thereby fixing them. The strap is grasped manually by an operator and hooked onto a hook at its free end, on which a loop is formed. This procedure is very time-consuming and cost-intensive and cannot be used reasonably for a fast-working printing press.

SUMMARY OF THE INVENTION

It is therefore an object or the present invention to provide a method for moving a stack of flat laminar products of the type mentioned, with which the risk of the products slipping when being moved is reduced and with which the stacks can be moved quickly and safely.

In addition, a moving device of the type mentioned is to be created, which enables quick and space-saving moving of the stacks in a structurally simple manner.

In an example, it is provided that the support part can be placed on the upper side of the stack before the stack is lifted and is pressed against the stack by tensioning the strap. The support part, which can be formed plate-shaped, for example, is positioned above the stack and preferably placed on the stack from above.

In order to place the strap, which may be a plastic strap or a fabric-plastic strap, around the stack on its lower face, a gripping device is provided which grips the strap, in particular, on the upper side of the support part, draws it from a strap storage spool, and places it around the stack on its lower face. A $2^{nd}$ holding part can be arranged on the support part and in particular on the upper side of the support part, on which holding part the strap is fixed and in particular hooked in a releasable manner by means of the gripping device after being wrapped around the stack.

After the strap is fixed to the $2^{nd}$ holding part, the strap is pulled tight or tensioned by means of the strap storage spool, which is attached to the support part and preferably on the upper side of the support part. As a result, the support part is pressed against the stack from above and the stack to be transported is fixed below the support part. The support part can then be lifted together with the stack, clamped to it, by means of a lifting device, for example, an articulated robot or other lifting device, and taken to the desired target storage area, i.e., to a pallet or carton, and placed there on the intended position. The strap is then preferably released on one side at the $2^{nd}$ holding part and, in particular, wound onto the strap storage spool by activating it and pulled out from under the stack.

Because the strap is relatively thin, it does not hinder the insertion of the stack with a tight fit into a carton or immediately setting the stack on another stack.

Preferably, the strap can be gripped by the gripping device on the upper side of the support part, which side faces away from the stack.

Preferably, the gripping device can be designed so that the strap is gripped from behind and grasped in a form-fitting manner. Alternatively or in addition to this, the strap can also be clamped between clamping jaws and then pulled off.

The strap can be secured at one end to the strap storage spool to be able to be wound on the strap storage spool. In a preferred embodiment of the invention, it is provided that the other end of the strap, facing away from the strap storage spool, is secured to a $1^{st}$ holding part on the support part. The strap can be clamped to the $1^{st}$ holding part, for example.

Preferably, the strap can be gripped by the gripping device in a strap section between the strap storage spool and the $1^{st}$ holding part.

The strap can be guided around at least two deflection rollers which are mounted on the support part and in particular on its upper side. The strap can be gripped by the gripping device in a strap section between the two deflection rollers, which ensures precise positioning of the strap when gripped by the gripping device.

The strap can be placed in a simple position around the stack. For example, the strap can be placed around the stack in a double layer or in a 4-fold layer. This can be achieved, for example, by fixing the free end of the strap to the $1^{st}$ holding part, which is arranged on the support part and in particular on the upper side of the support part. A section of the strap, located between the free strap end fixed to the $1^{st}$ holding part and the strap storage spool, is then gripped behind by the gripping device and pulled off so that the strap is in a double layer, wherein a $1^{st}$ layer is formed by a section of the strap, extending between the $1^{st}$ holding member and the gripping device, and a $2^{nd}$ layer is formed by a section of the strap, extending between the gripping device and the strap storage spool. The gripping device has then grasped a loop of the strap and, after wrapping around the stack, can fix it to the $2^{nd}$ holding part in a releasable manner.

The double-layer use of the strap brings with it the advantage that the strap can be returned to the strap storage spool after the stack has been set down by pulling in the outer layer of the strap. The $1^{st}$ layer of the strap lying against the stack does not exert any shear forces on the lower product of the stack, so that the lower product of the stack is not damaged or marked by drag marks.

The support part can be placed on the stack so that it is completely disposed on the upper side of the stack. This is achieved when the dimensions or the base area of the support part is equal to or smaller than the area of the upper side of the stack to be transported, so that the support part does not protrude laterally on any side of the stack. In this way, it is possible to insert the stack to be moved deep into a carton or container with a tight fit, without laterally protruding parts of the support part hindering the insertion.

In order to further increase the process security, the stack can be pressed together and compressed via a compression device before the strap is wrapped around the stack and, if necessary, before the support part is placed on the stack.

If the stack is placed on the upper side of a stack already positioned at the target storage area, it is preferably provided to arrange an intermediate layer, for example, of cardboard between the lower stack and the stack now to be placed on top of it, in order to prevent the strap from marking or damaging the upper product of the lower stack when it is pulled out.

With regard to the moving device, the above-mentioned object is achieved in that a rotatably mounted strap storage spool is arranged on the upper side of the preferably plate-shaped support part, from which spool the strap can be drawn and onto which the strap can be wound. By pulling in or winding up the strap, the strap wrapped around and fixed to the stack can be tensioned, causing the support part to be tensioned to the upper side of the stack and pressed against it. For gripping the stack and wrapping around the stack, a gripping device is provided by means of which the strap can be drawn from the strap storage spool, guided around the stack on its lower face, and secured in a releasable manner, in particular to a $2^{nd}$ holding part. The $2^{nd}$ holding part is preferably arranged on the support part and in particular on the upper side of the support part.

The gripping device can comprise a gripper that is movable in space and has at least two gripping jaws and/or at least one gripping roller.

The strap storage spool can have a drive device, for example, a servomotor.

When the strap wraps around the stack, the strap can be formed in a single layer or in a double layer. Preferably, the free end of the strap is secured to a $1^{st}$ holding part, which is preferably formed on the support part and in particular on the upper side of the support part.

Preferably, at least two deflection rollers, around which the strap is guided, can be mounted on the support part. The gripping device is preferably designed so that the strap can be gripped by the gripping device in a strap section between the two deflection rollers.

Preferably, a compression device can be provided by means of which the stack can be pressed together and compressed, in particular before the support part is placed on it.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
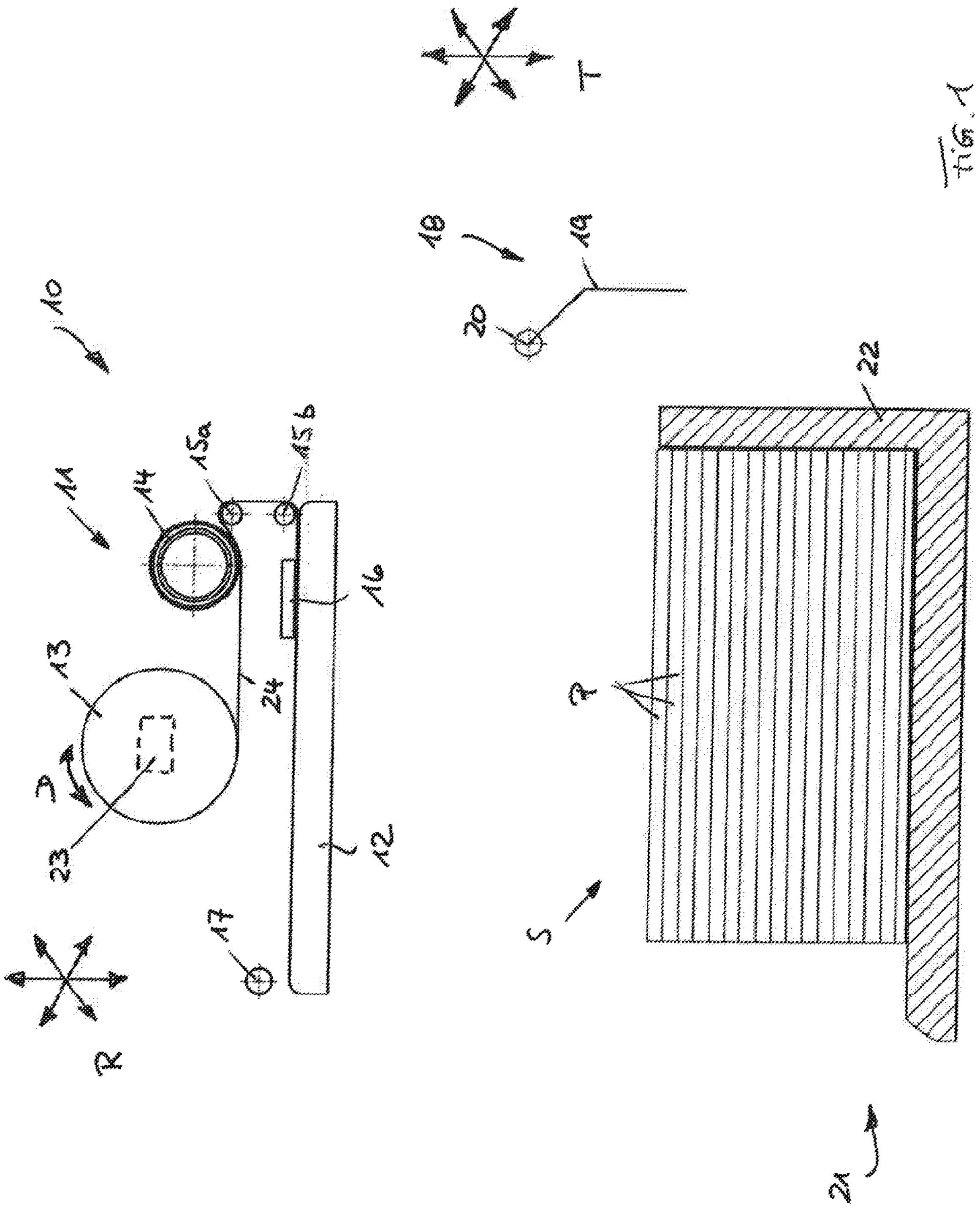
FIG. 1 shows the essential elements of a moving device in a schematic diagram in a first phase of the method.

FIG. 1 shows a stack S of flat laminar products P, for example, newspapers, wherein stack S is positioned on a staging area 21 and is to be moved from there. In the example shown, staging area 21 has an L-shaped positioning part 22 on which stack S is arranged in a predetermined orientation.

A moving device 10 has a plate-shaped support part 12, on the upper side of which a strap storage spool 13 is rotatably mounted. Strap storage spool 13 can be rotated by means of a drive device 23, shown only schematically, as indicated by the double arrow D. A strap 24, which may be a plastic strap or a fabric-plastic strap, is wound on strap storage spool 13. One end of strap 24 is attached to strap storage spool 13. Strap 24 runs starting from strap storage spool 13 over a $1^{st}$ deflection roller 15*a*, which is arranged on the upper right side of support part 12 according to FIG. 1, and from there to a further $2^{nd}$ deflection roller 15*b* arranged at a distance below, and from this to a $1^{st}$ holding part 16, with which another end of strap 24 or the free end of strap 24 is fixed and in particular clamped on the upper side of support part 12. In the section of strap 24 lying between strap storage spool 13 and $1^{st}$ deflection roller 15*a*, the force of a displaceably mounted and, in particular, spring-loaded tensioning roller 14 acts on strap 24, as a result of which strap 24 is held under tension.

On the side of support part 12, said side being opposite deflection rollers 15*a*, 15*b*, a $2^{nd}$ holding part 17 is arranged on the upper side of support part 12.

Support part 12 can be moved in space together with strap storage spool 13, deflection rollers 15*a*, 15*b*, tensioning roller 14, $1^{st}$ holding part 16, and $2^{nd}$ holding part 17, as indicated by the arrows R. For this purpose, carrying device 11 can be connected to an articulated robot, for example.

Furthermore, a gripping device 18 is provided, comprising a gripper 19 movable in space, as indicated by the double arrows T. Gripper 19 carries a gripper roller 20 at its front end.

The process of moving stack S is described below in individual steps.

Figure 2:
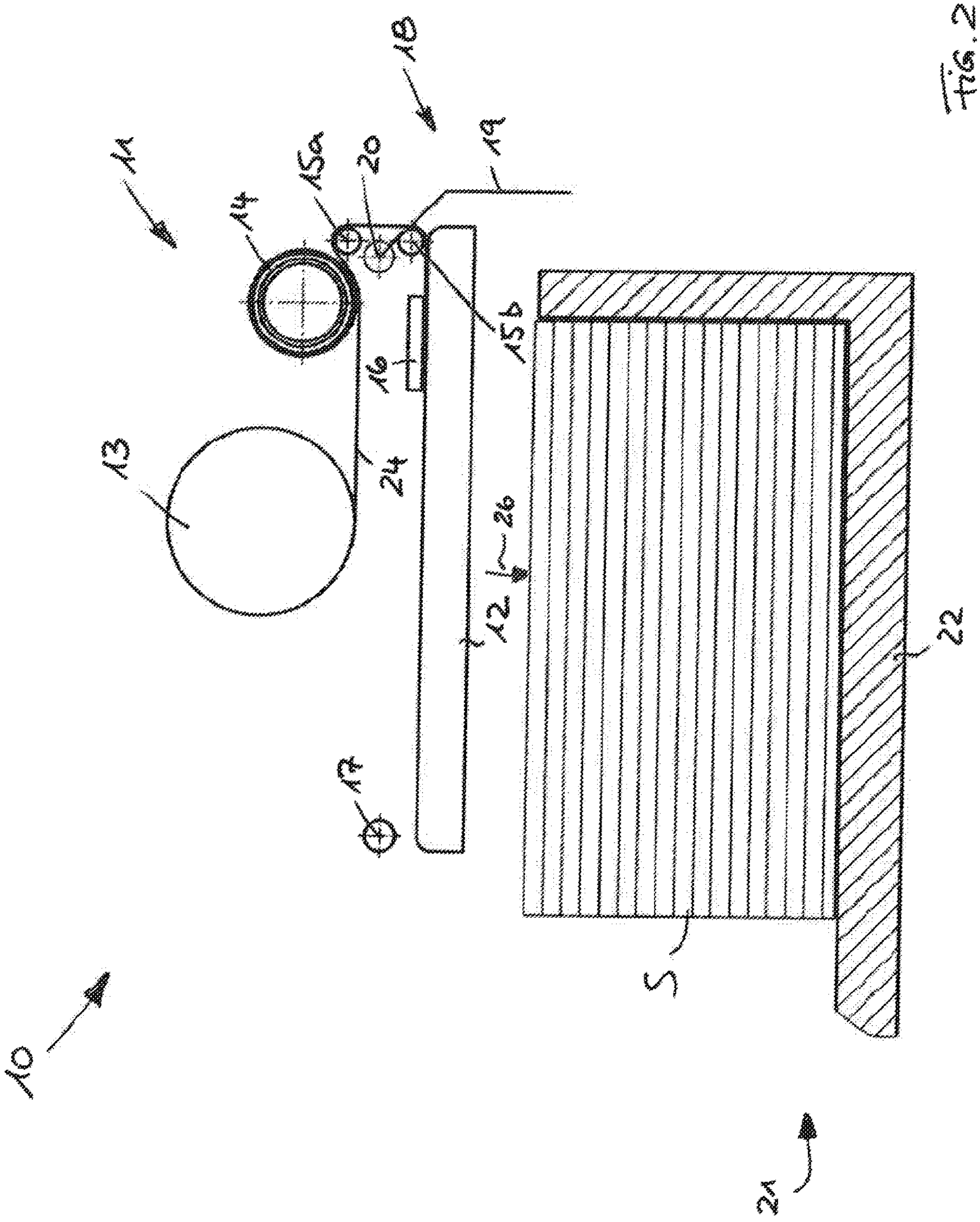
FIG. 2 shows the moving device according to FIG. 1 in a second phase of the method.
Figure 3:
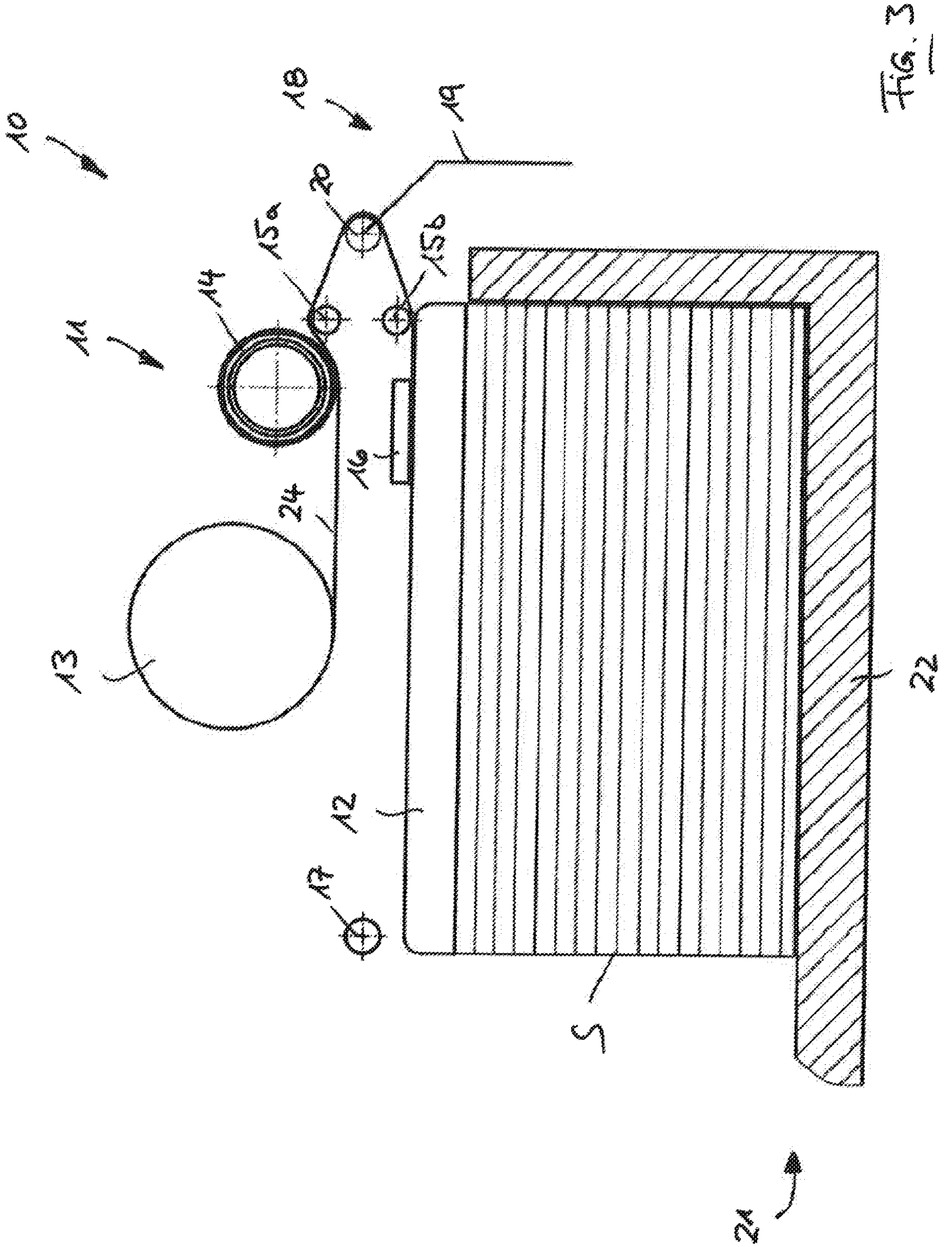
FIG. 3 shows the moving device according to FIG. 1 in a third phase of the method.

First, carrying device 11 is positioned so that gripping device 18 can engage with gripping roller 20 between the two deflection rollers 15*a*, 15*b*, as shown in FIG. 2. Stack S can be compressed by a compression device 26, which is shown only symbolically. Gripping device 18 is then moved so that strap 24 is pulled off strap storage spool 13 by means of gripping device 18. Because the free end of strap 24 is fixed to $1^{st}$ holding part 16, a loop or double layer of strap 24 is formed, as shown in FIG. 3.

Carrying device 11 lies with the plate-shaped support part 12 on the upper side of stack S and thereby stabilizes and/or compresses it.

Figure 4:
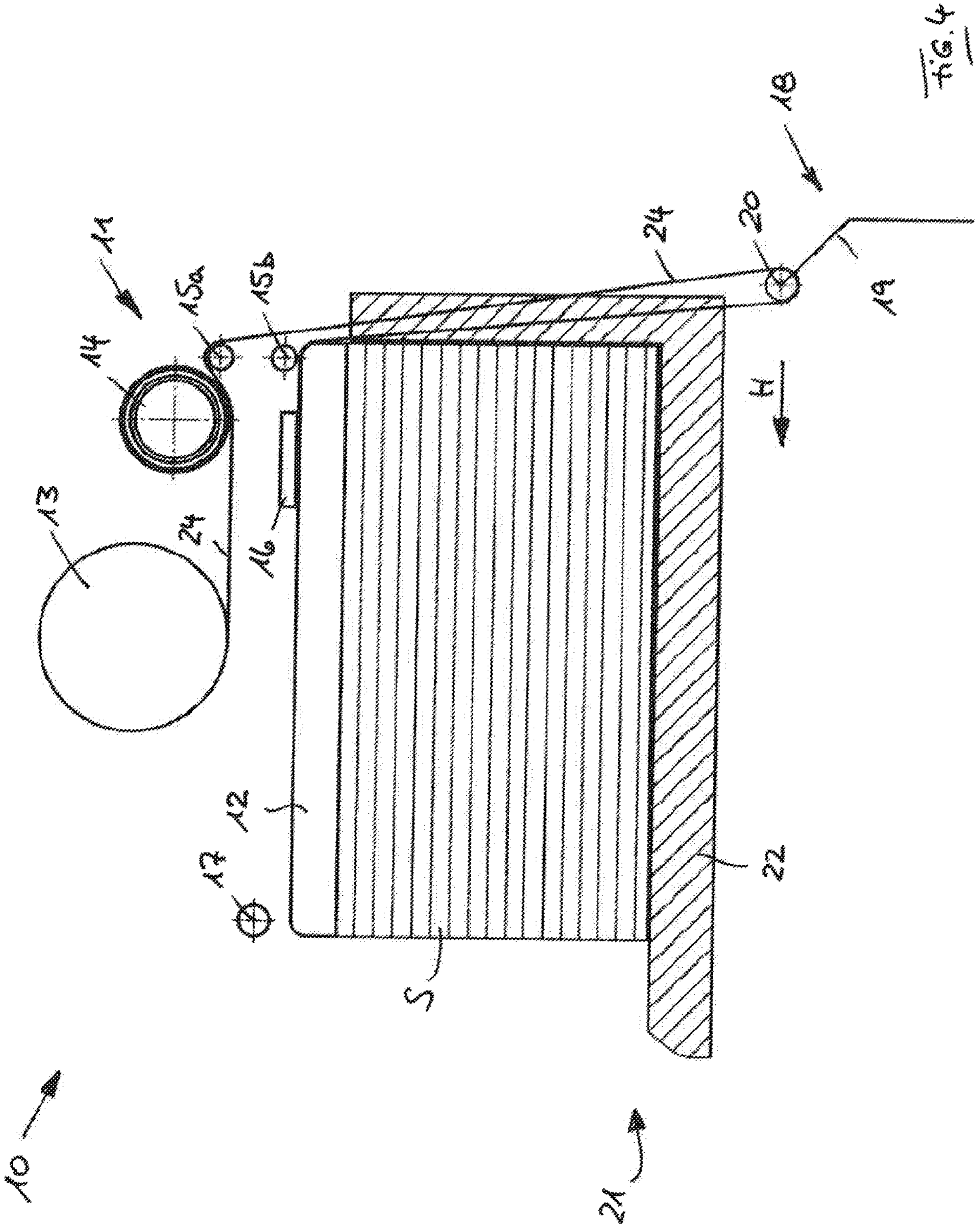
FIG. 4 shows the moving device according to FIG. 1 in a fourth phase of the method.

The gripping device then passes under stack S and under positioning part 22 while strap 24 is simultaneously drawn from strap storage spool 13, as indicated by the arrow H in FIG. 4, wherein strap 24 continues to be drawn from strap storage spool 13 and held in a double layer.

Figure 5:
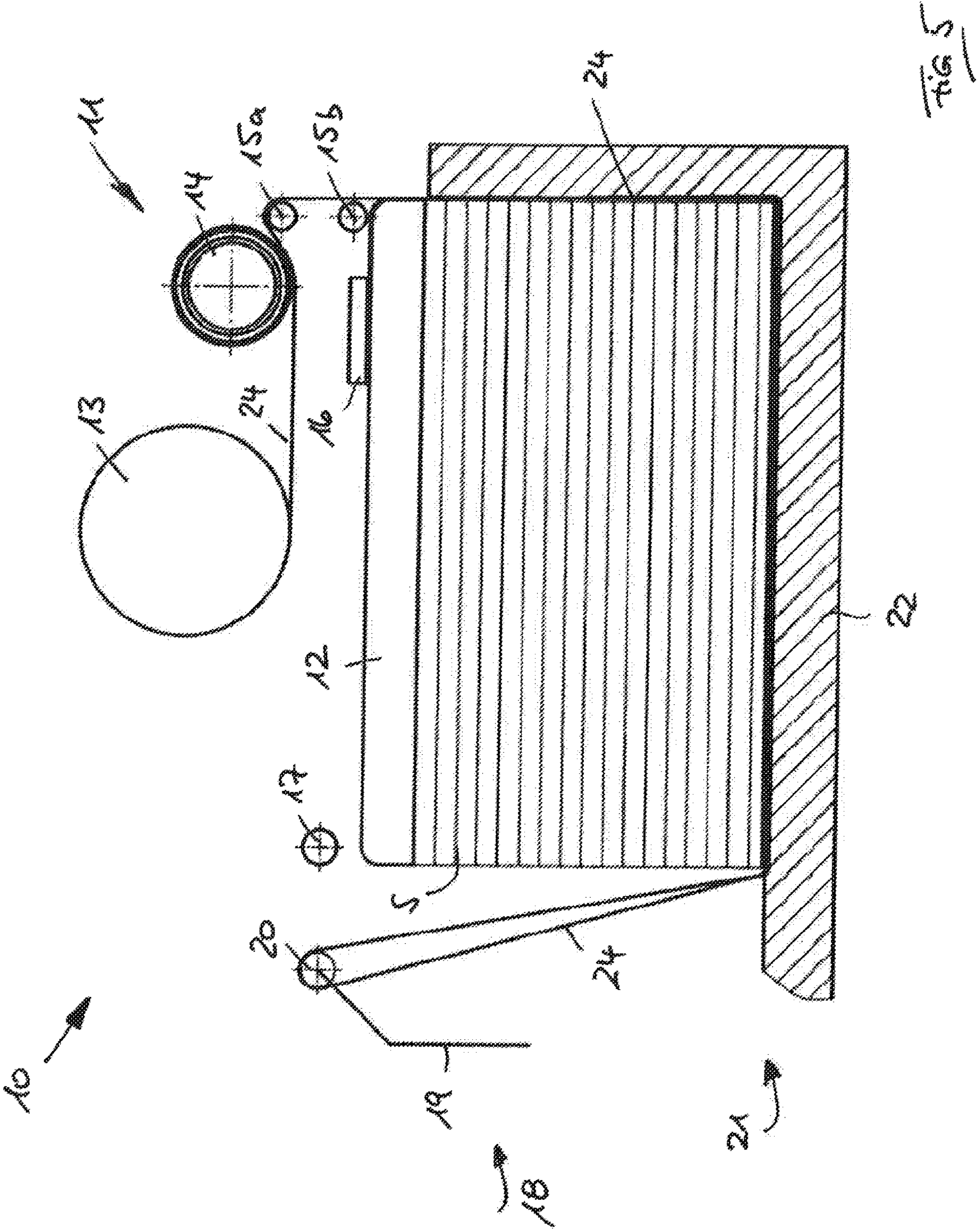
FIG. 5 shows the moving device according to FIG. 1 in a fifth phase of the method.
Figure 6:
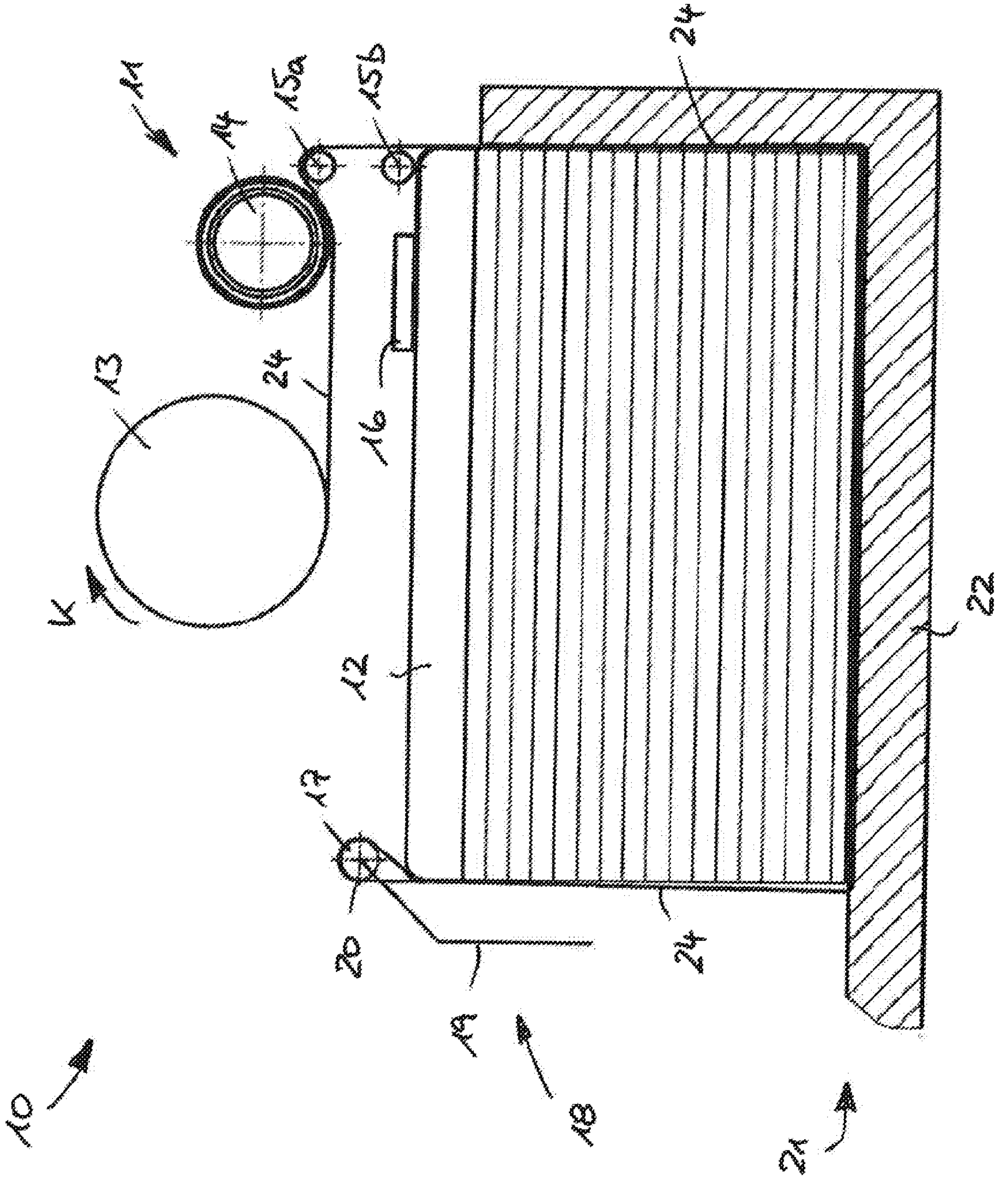
FIG. 6 shows the moving device according to FIG. 1 in a sixth phase of the method.

Gripping device 18 moves with strap 24 around stack S until it is located close to the $2^{nd}$ holding part 17 attached to support part 12, as shown in FIG. 5. Strap 24 is then secured to $2^{nd}$ holding part 17 by gripping device 18, so that strap 24 wraps around stack S in a double layer. Then strap storage spool 13 is rotated (see arrow K in FIG. 6) so that strap 24 is drawn in. However, because strap 24 is secured to $2^{nd}$ holding part 17, strap 24 is tensioned and support part 12 is clamped against stack S from above, so that stack S is clamped and fixed between strap 24 and support part 12.

Figure 7:
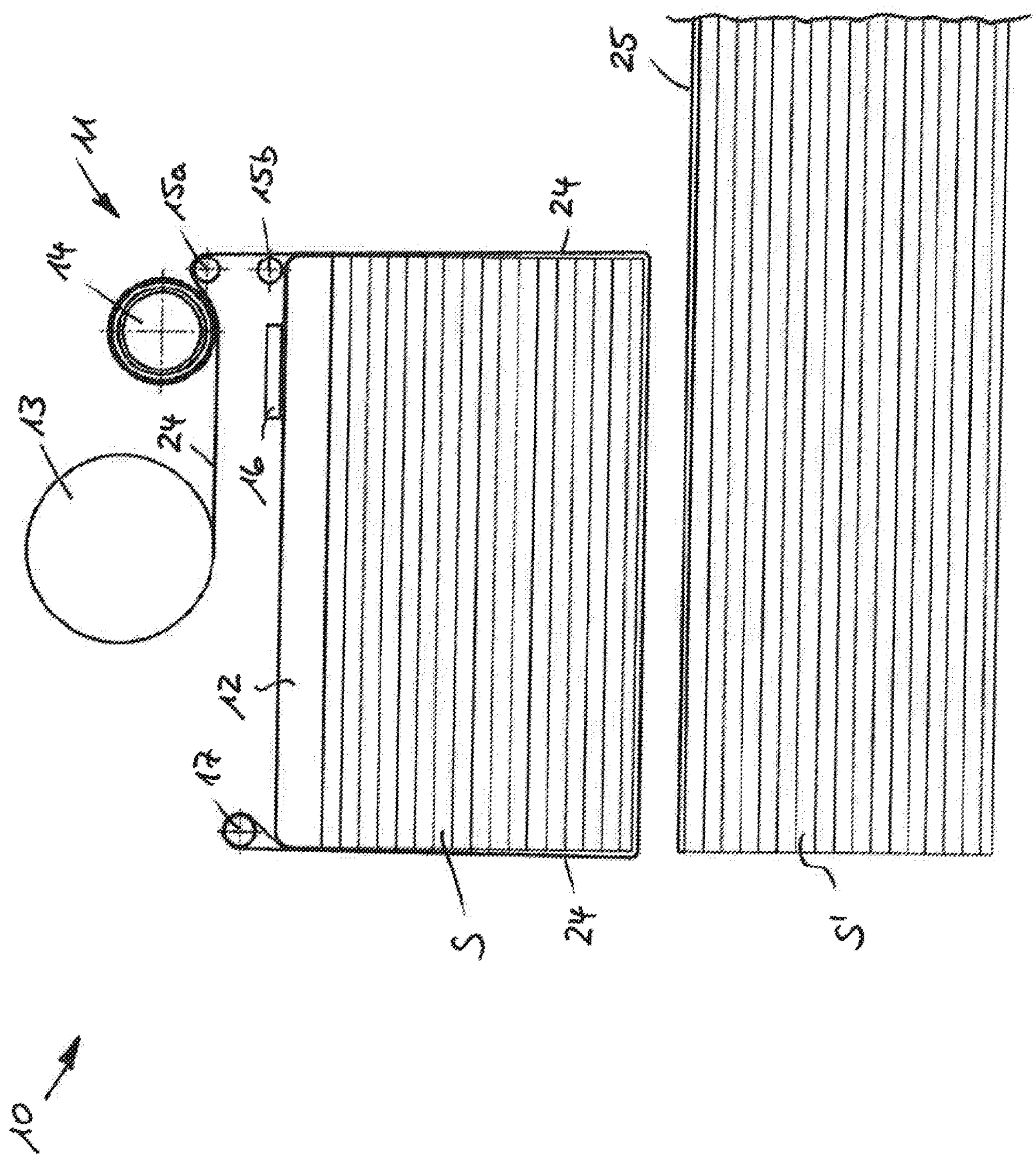
FIG. 7 shows the moving device according to FIG. 1 when the stack is being set down.

Carrying device 11 is then lifted together with stack S and placed on a target storage area. According to FIG. 7, it is provided that a stack S' is already present from a previous moving operation, onto which stack S gripped by carrying device 11 is to be placed. A cover 25, for example, in the form of a cardboard intermediate layer, onto which carrying device 11 places the stack S, is arranged on the upper side of stack S' already present at the target storage area, as shown in FIG. 7.

Figure 8:
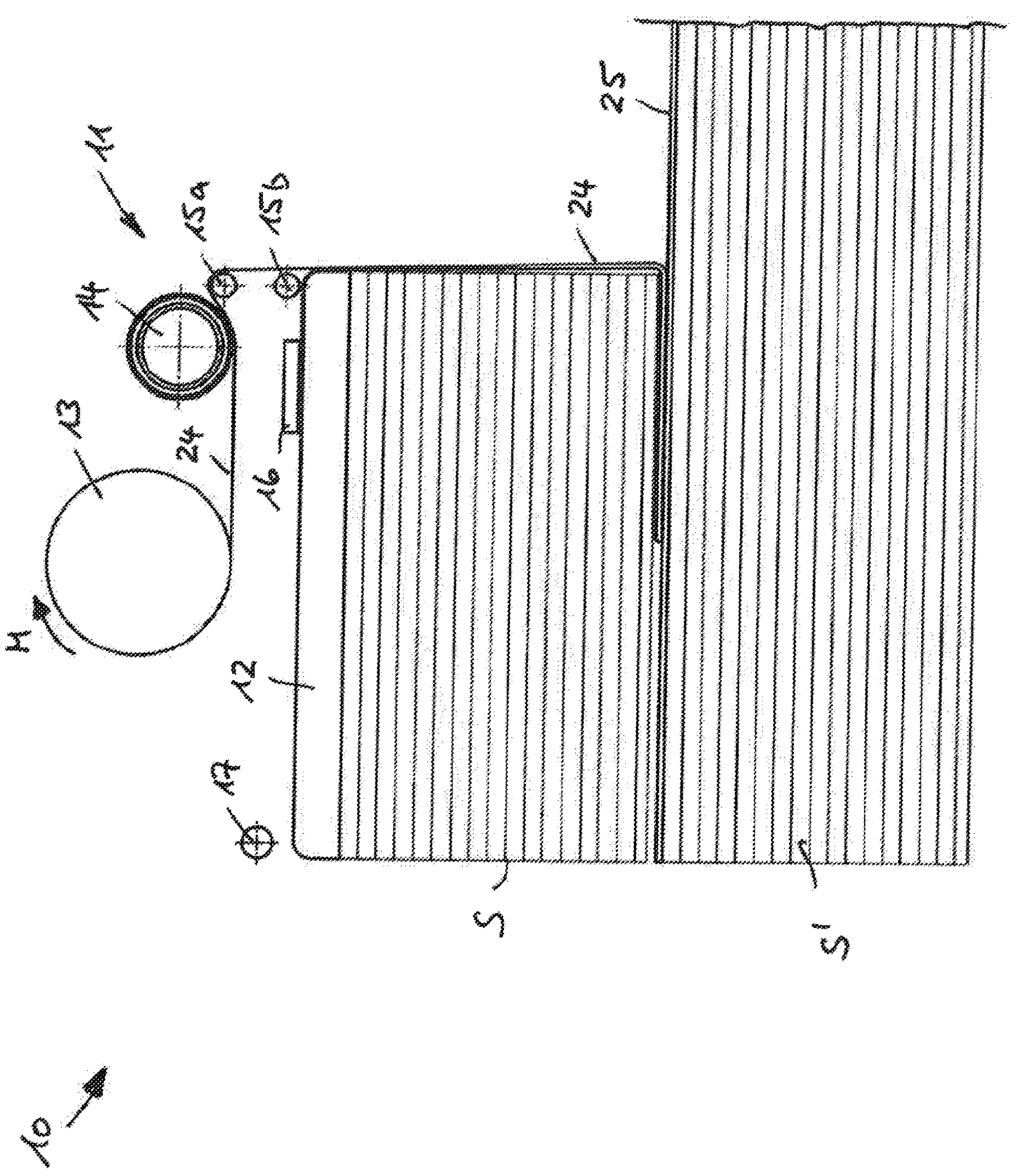
FIG. 8 shows the moving device according to FIG. 1 when the strap is being pulled out.

After stack S reaches the desired position, the engagement between strap 24 and $2^{nd}$ holding part 17 is released and strap 24 is pulled through under stack S by activating strap storage spool 13 (arrow M) and wound onto strap storage spool 13, as shown in FIG. 8.

Figure 9:
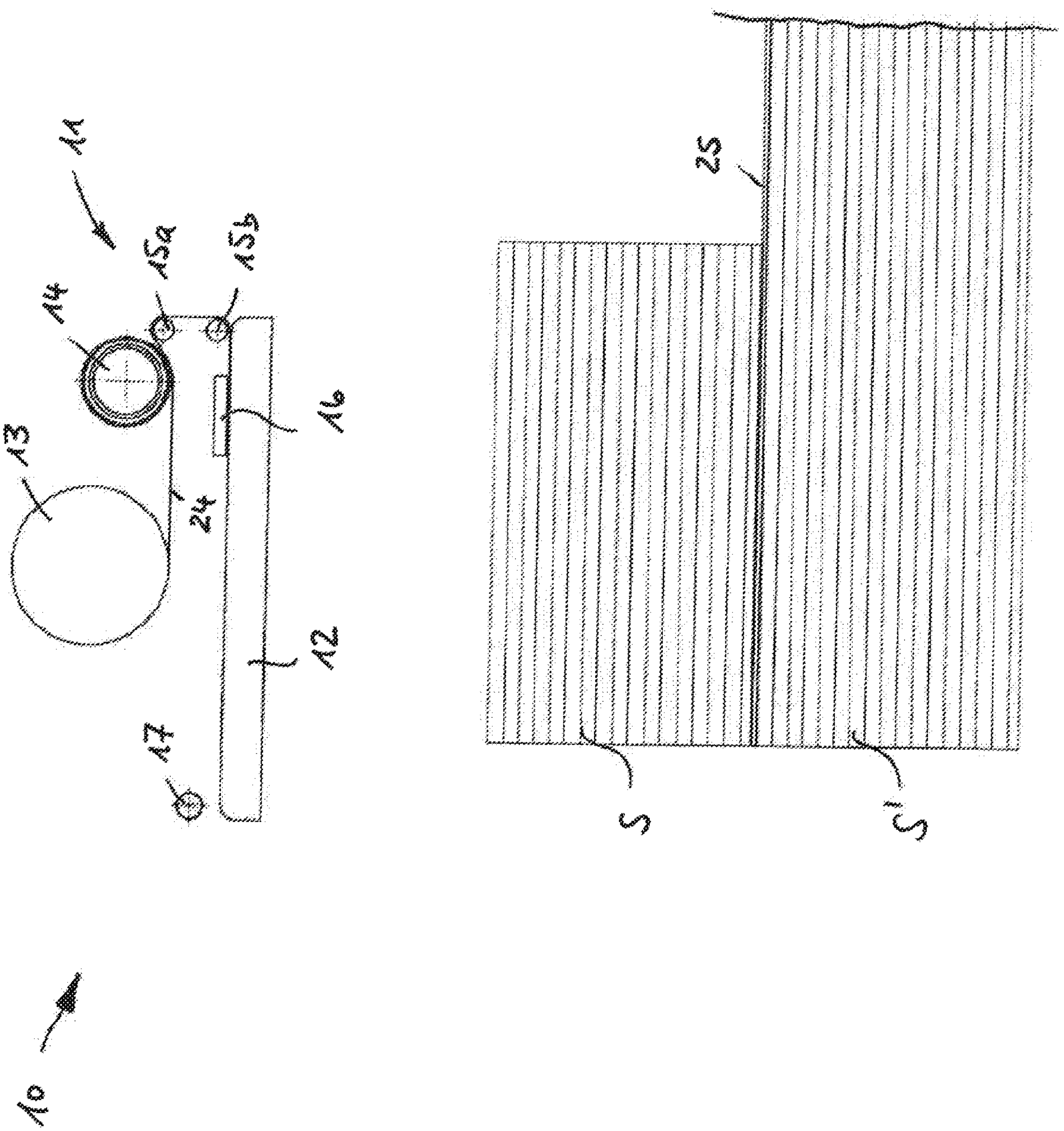
FIG. 9 shows the moving device according to FIG. 1 after the moving has ended.

Strap 24 is now no longer engaged with stack S, so that carrying device 11 can be lifted off placed stack S and moved to another stack to be moved, as shown in FIG. 9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for moving a stack of flat laminar products via a carrying device which has a support part, which is positioned above the stack, and has a strap, which is securable to the support part, the method comprising:

guiding the strap around the stack on a lower face; and securing the strap to the support part;

pressing the support part against the stack by tensioning the strap;

lifting the stack, which is surrounded by the strap on the lower face;

placing the stack on a target storage area; and releasing the strap from the stack, wherein the strap is gripped by a gripping device and is drawn from a strap storage spool that is mounted on the support part and the strap is placed around the stack, and wherein the strap is wound onto the strap storage spool for tensioning.

2. The method according to claim 1, wherein the strap is gripped by the gripping device on an upper side of the support part, which side faces away from the stack.

3. The method according to claim 1, wherein an end of the strap, said end facing away from the strap storage spool, is secured to a 1st holding part on the support part, and wherein the strap is gripped by the gripping device in a strap section between the strap storage spool and the 1st holding part.

4. The method according to claim 1, wherein the strap is guided around at least two deflection rollers, which are mounted on the support part, and wherein the strap is gripped by the gripping device in a strap section between the two deflection rollers.

5. The method according to claim 1, wherein the strap is placed around the stack on its lower face in a double layer or in a quadruple layer.

6. The method according to claim 1, wherein the support part is placed on the upper side of the stack so that it is completely disposed on the upper side of the stack.

7. The method according to claim 1, wherein the stack is pressed together and compressed via a compression device before the strap is wrapped around the stack.

8. A moving device for moving a stack of flat laminar products, the moving device comprising:

a carrying device that comprises a support part and a strap that is adapted to be placed around the stack on a lower face thereof, the support part having a first holding part and a second holding part arranged thereon;

a rotatably mounted strap storage spool is arranged on an upper side of the support part, from which spool the strap is adapted to be drawn and onto which the strap is adapted to be wound; and a gripping device via which the strap is gripped and drawn from the strap storage spool and placed around the stack on its lower face and secured in a releasable manner, wherein the strap is adapted to be secured in a releasable manner via the gripping device to the second holding part arranged on the support part.

9. The moving device according to claim 8, wherein the strap storage spool has a drive device.

10. The moving device according to claim 8, wherein the second holding part is arranged on the upper side of the support part.

11. The moving device according to claim 8, wherein the strap is guided around at least two deflection rollers that are mounted on the support part, and wherein the strap is adapted to be gripped by the gripping device in a strap section between the two deflection rollers.

12. The moving device according to claim 8, further comprising a compression device via which the stack is pressed together and compressed.

13. A moving device for moving a stack of flat laminar products, the moving device comprising:

a carrying device that comprises a support part and a strap that is adapted to be placed around the stack on a lower face thereof;

a rotatably mounted strap storage spool is arranged on an upper side of the support part, from which spool the strap is adapted to be drawn and onto which the strap is adapted to be wound; and a gripping device via which the strap is gripped and drawn from the strap storage spool and placed around the stack on its lower face and secured in a releasable manner, wherein an end of the strap facing away from the strap storage spool, is secured to a first holding part on the support part.

14. The moving device according to claim 13, wherein the first holding part is arranged on the upper side of the support part.

* * * * *